United States Patent
Rothschild et al.

(10) Patent No.: US 10,010,741 B2
(45) Date of Patent: *Jul. 3, 2018

(54) QUIET BUMPER PLATE

(71) Applicant: Sound Shore Innovations L.L.C., Darien, CT (US)

(72) Inventors: Kyle D. Rothschild, Darien, CT (US); Michael Bousquet, Norwalk, CT (US)

(73) Assignee: Sound Shore Innovations L.L.C., Darien, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/221,819

(22) Filed: Jul. 28, 2016

(65) Prior Publication Data

US 2018/0028857 A1    Feb. 1, 2018

(51) Int. Cl.
| A63B 21/00 | (2006.01) |
| A63B 21/072 | (2006.01) |
| F16F 1/373 | (2006.01) |
| A63B 71/00 | (2006.01) |

(52) U.S. Cl.
CPC ...... *A63B 21/0726* (2013.01); *A63B 21/0724* (2013.01); *A63B 21/0728* (2013.01); *A63B 71/00* (2013.01); *F16F 1/3732* (2013.01)

(58) Field of Classification Search
CPC . A63B 21/06; A63B 21/0601; A63B 21/0604; A63B 21/0607; A63B 21/072–21/075; A63B 21/0783; F16F 1/3615; F16F 1/3732; F16F 1/377; B60C 7/10; B60C 7/14; B60C 7/143; B60C 7/12; B60C 2007/146

See application file for complete search history.

(56) References Cited

U.S. PATENT DOCUMENTS

| 514,708 A | 2/1894 | Finnigan |
| 557,151 A | 3/1896 | Schau |
| 811,232 A | 1/1906 | Lang et al. |
| 1,126,447 A | 1/1915 | Granger |
| RE15,872 E | 7/1924 | Brubaker |
| 2,447,218 A | 8/1948 | Trzesniewski |
| 3,188,775 A * | 6/1965 | Cosmos ............. B24B 21/14 |
| | | 152/323 |
| 5,853,355 A | 12/1998 | Standish |
| 6,436,015 B1 | 8/2002 | Frasco et al. |
| 6,615,885 B1 | 9/2003 | Ohm |
| 6,702,723 B2 | 3/2004 | Landfair |

(Continued)

FOREIGN PATENT DOCUMENTS

| EP | 2 679 406 A1 | 1/2014 |
| WO | WO 2008/036789 A2 | 3/2008 |

OTHER PUBLICATIONS

Ivanko Bumper plate, last viewed May 16, 2016.

(Continued)

*Primary Examiner* — Gregory Winter
(74) *Attorney, Agent, or Firm* — Mark Nowotarski (57) ABSTRACT

A disk shaped quiet bumper plate for a barbell has a rim of elastomeric material with a shock absorber region. The shock absorber region has a circumferential row of evenly spaced transverse holes. The material between the holes forms radial walls which act as shock absorbers when the bumper plate is dropped. This reduces noise without unduly increasing bounce.

3 Claims, 6 Drawing Sheets

(56) References Cited

U.S. PATENT DOCUMENTS

| | | | |
|---|---|---|---|
| 6,991,590 B2* | 1/2006 | Vigiano | A63B 21/06 482/106 |
| 7,174,934 B2* | 2/2007 | Hill, III | B60C 7/10 152/209.17 |
| 7,198,591 B2* | 4/2007 | Lien | A63B 21/0728 482/106 |
| 7,704,196 B2 | 4/2010 | Lien et al. | |
| 8,128,539 B2 | 3/2012 | Dickerson | |
| 9,139,045 B2* | 9/2015 | Palinkas | B60C 7/102 |
| 2004/0092370 A1* | 5/2004 | Lincir | A63B 21/072 482/107 |
| 2005/0054496 A1 | 3/2005 | Harms et al. | |
| 2006/0073948 A1 | 4/2006 | Lincir | |
| 2007/0119531 A1 | 5/2007 | Steinke et al. | |
| 2008/0012365 A1 | 1/2008 | Harvey | |
| 2008/0200315 A1 | 8/2008 | Lin | |
| 2010/0132858 A1 | 6/2010 | Arakawa et al. | |
| 2010/0200131 A1 | 8/2010 | Iwase et al. | |
| 2010/0230022 A1 | 9/2010 | Kim | |
| 2011/0017377 A1* | 1/2011 | Albert | B60C 17/06 152/520 |
| 2012/0234444 A1 | 9/2012 | Palinkas et al. | |
| 2014/0367007 A1 | 12/2014 | Thompson | |
| 2016/0051856 A1 | 2/2016 | Breitkreutz et al. | |
| 2016/0214435 A1 | 7/2016 | Schaedler et al. | |

OTHER PUBLICATIONS

Ivanko Olympic Rubber Coated E-Z Lift Plates—Ivanko (ROEZH), last viewed Jul. 1, 2016.

Apollo Athletics Kettlebell with Bottom Rubber Band, last viewed Jun. 29, 2016.

McLaren Manufacturer of Tracks and Tires, McLaren Industries Expands Popular Nu-Air Solid Cushion Tires to Include Backhoes, https://www.mclarenindustries.com/us/en/news-and-resources/news/219/mclaren-industries-expands-popular-nu-air-solid-cushion-tires-to-include-backhoes/, last viewed Jul. 12, 2016.

Rogue Bumpers by Hi-Temp LB, http://www.roguefitness.com/rogue-hi-temp-bumper-plates, last viewed Jul. 7, 2016.

Rogue Catalog, Roguefitness.com, dated Mar. 21, 2016, last viewed Jul. 7, 2016.

Rogue Hg 2.0 Bumper Plates, http://www.roguefitness.com/rogue-hg-2-0-bumper-plates, last viewed Jul. 7, 2016.

ExxonMobil Product Datasheet, Santoprene™ 101-64 Thermoplastic Vulcanizate, Effective Date Jun. 20, 2014, last viewed Jul. 8, 2016.

Wikipedia.com, Airless tire, https://en.wikipedia.org/wiki/Airless_tire, last viewed May 16, 2016.

Wikipedia.com, Barbell, https://en.wikipedia.org/wiki/Barbell, last viewed May 10, 2016.

Wikipedia.com, Shore durometer, https://en.wikipedia.org/wiki/Shore_durometer, last viewed Jul. 12, 2016.

Fitness Gear Rubber Hex 5-50 lb Dumbbell Set, http://www.dickssportinggoods.com/product/index.jsp?productId=35545896, last viewed Jul. 8, 2016.

Wikipedia.com, Disks (mathematics), viewed Aug. 15, 2017.

Massenomics.com/shop, How to Build Your Own Strongman Deadlift Tires (and Why) (Blog/2016/5/18/How-To-Build-Your-Own-Strongman_Deadlift-Tries), viewed Aug. 15, 2017.

Wikipedia.com, Optical disc, viewed Aug. 15, 2017.

* cited by examiner

QUIET BUMPER PLATE

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever. The term "Stealth" is a trademark of Sound Shore Innovations L.L.C.

FIELD OF THE INVENTION

Embodiments of the present invention relate to weight training equipment.

BACKGROUND OF THE INVENTION

Figure 1:
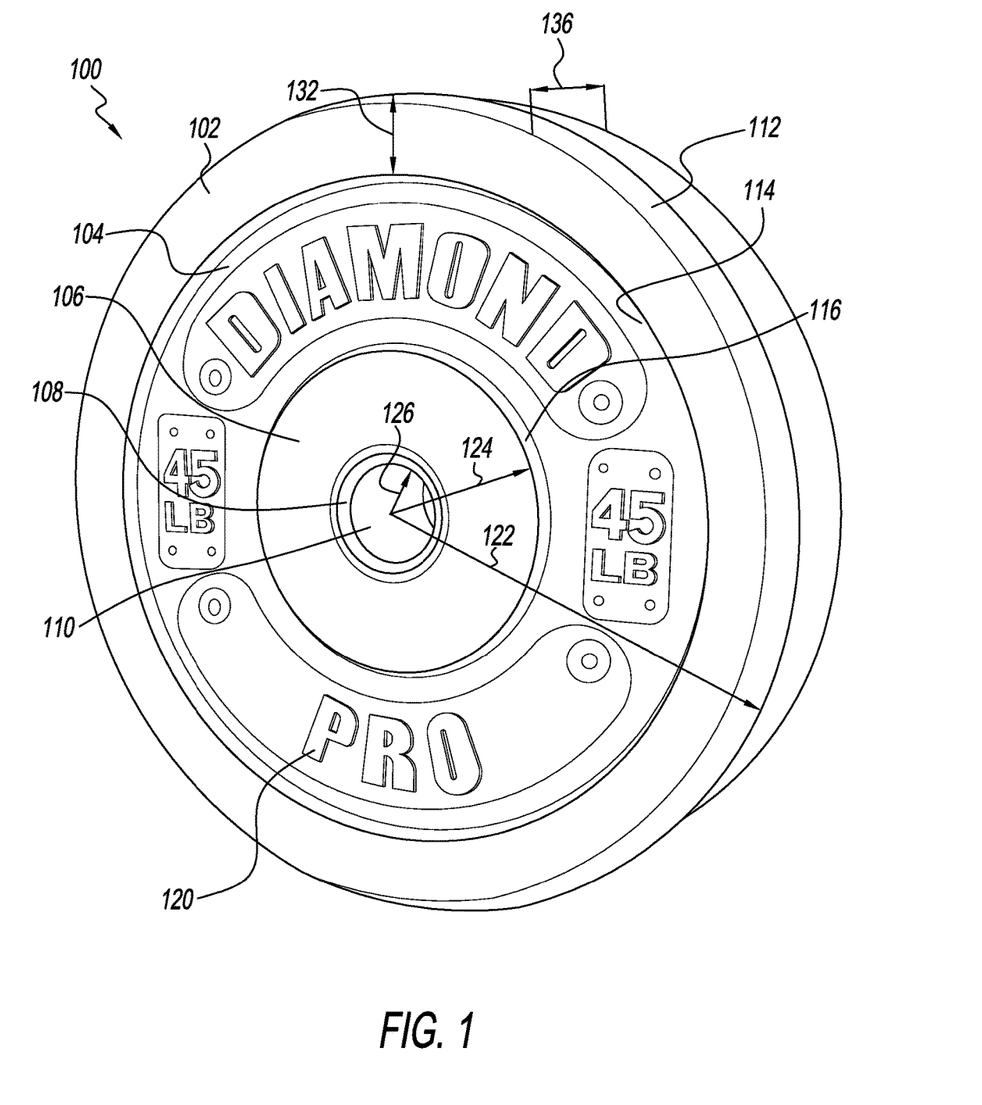
FIG. 1 is a front perspective view of a conventional bumper plate.

FIG. 1 is a front perspective view of a prior art bumper plate 100. A bumper plate is a disk shaped weight that is mounted on a bar bell for weight training. The bumper plate comprises an outer rim 102, body 104, hub 106 and collar 108. The collar describes a central bar hole 110. The interface between the rim and body comprises an undercut 114. Thus the thickness of the body may be somewhat less than the thickness of the rim. The interface between the body and the hub comprises a step 116. Thus the hub may have a larger thickness than the body. The larger thicknesses of the rim and hub relative to the body allow for raised indicia 120 to be molded into the body. The hub and rim protect said indicia when the bumper plate lies flat on the ground. The undercut also acts as a handle to make it easier to lift the bumper plate. The outer edge of the rim comprises a bevel 112. This makes it easier to pick up the bumper plate when it is lying flat on the ground.

A typical bumper plate may have a radius 122 in the range of 8.75 inches to 8.86 inches. 8.86 inches is a standard size for competition. The bar hole radius 126 is about 1 inch. The hub radius 124 is about 4.26 inches. The rim height 132 is about 1.77 inches. The undercut is about 0.43 inches. The rim thickness 136 may be in the range of 1.4 inches to 3.75 inches depending upon the weight of the bumper plate.

The bumper plate may be made of solid rubber, bonded crumb rubber, polyurethane or other elastomer. The durometer of the elastomer may be in the range of 70 to 90. The collar may be made of metal. The hub may comprise a metal disk plate for extra weight.

One of the drawbacks of the prior art bumper plate design is that there is a tradeoff between the noise made when the bumper plates are dropped on the floor and the amount of bounce in the bumper plates after they hit the floor. Low durometer elastomers (e.g. 70) are relatively quiet, but they have a high bounce which can lead to injury. High durometer elastomers (e.g. 90) have a low bounce, but can make a very loud noise when dropped. Thus there is a long felt need for a bumper plate design that has both low bounce and low noise when dropped.

SUMMARY OF THE INVENTION

The summary of the invention is provided as a guide to understanding the invention. It does not necessarily describe the most generic embodiment of the invention or the broadest range of alternative embodiments.

Figure 2:
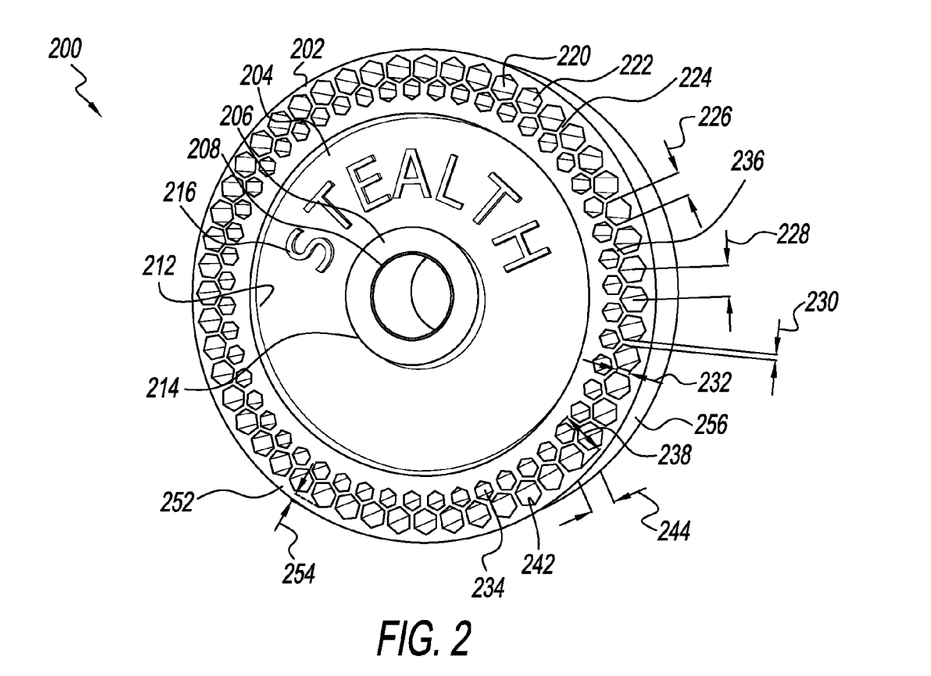
FIG. 2 is a front perspective view of an embodiment of a quiet bumper plate.

FIG. 2 is a front perspective view of a quiet bumper plate 200. The bumper plate is disk shaped with a shock absorber region 220 in the rim 202. The shock absorber region comprises a first circumferential row of first holes 222. The holes pass transversely through the rim and are evenly spaced. The holes in this example are hexagonal, but any shape may be used. The internal corners of the hexagons are rounded to reduce cracking. A suitable internal radius of curvature of the internal corners 242 is in the range of 0.02 inches to 0.05 inches. The elastomeric material between the holes forms radial walls 224. These act as shock absorbers when the bumper plate is dropped on the ground thus reducing the noise emitted without unduly increasing bounce. For bumper plates with a radius of about 8.75 inches or greater, a suitable first hole width 226 is in the range of 0.5 inches to 0.75 inches. A suitable hole spacing 228 is in the range of 0.75 inches to 1.5 inches. A suitable wall width 230 is in the range of 0.13 inches to 0.5 inches. A suitable wall height 232 is in the range off 0.5 inches to 1 inch.

A second circumferential row of second holes 234 may be provided adjacent to the row of first holes. The second holes pass transversely through the disk. The second holes form a plurality of circumferential walls 236 with the first holes. These provide additional shock absorbing capability.

Additional rows of holes may be provided. The holes do not have to be the same shape or size within a given row. A suitable overall height of the shock absorber 238 region taken up by the rows of holes may be in the range of 0.5 inches to 1.5 inches.

Sufficient clearance 254 should be provided between the first holes and the outer radial surface of the disk 256 to form a skin 252. A suitable skin thickness is in the range of 0.06 inches to 0.25 inches. Larger thicknesses can be used for stronger skins. The outer radial surface may also comprise radial projections that can act as shock absorbers.

The quiet bumper plate may comprise a rim 202, body 204, hub 206 and collar 208. An undercut 212 may be provided at the interface of the rim and body. A step 214 may be provided at the interface of the body and hub. The dimensions of the rim, body, hub, collar, undercut and step may be similar to the dimensions of the corresponding features of the prior art bumper plate of FIG. 1. The undercut and step recess the body relative to the rim and hub so that raised indicia 216 may be provided in the body. A bevel (not shown) may also be provided on the outer corner of the rim.

In order to keep the same plate radius and weight as the prior art, the thickness 244 of the plate a may be increased to account for the loss of material from the holes. Higher density materials may be also be added. An example is metal plates provided at the hub or internal to the bumper plate to increase overall density without unduly increasing thickness.

The quiet bumper plate may be made of an elastomer, such as rubber, pressed crumb rubber, poly urethane or mixtures thereof. Durometers may be in the range of 60 to 90. Lower durometer elastomers may be used in bumper plates designated for home use. This will help keep the noise to levels acceptable in homes. A different durometer may be used in the shock absorber region relative to the rest of the quiet bumper plate.

DETAILED DESCRIPTION

The detailed description describes non-limiting exemplary embodiments. Any individual features may be combined with other features as required by different applications for at least the benefits described herein.

As used herein, the term "about" means plus or minus 10% of a given value unless specifically indicated otherwise.

As used herein, the term "shaped" means that an item has the overall appearance of a given shape even if there are minor variations from the pure form of said given shape.

Alternative Embodiments

Figure 3:
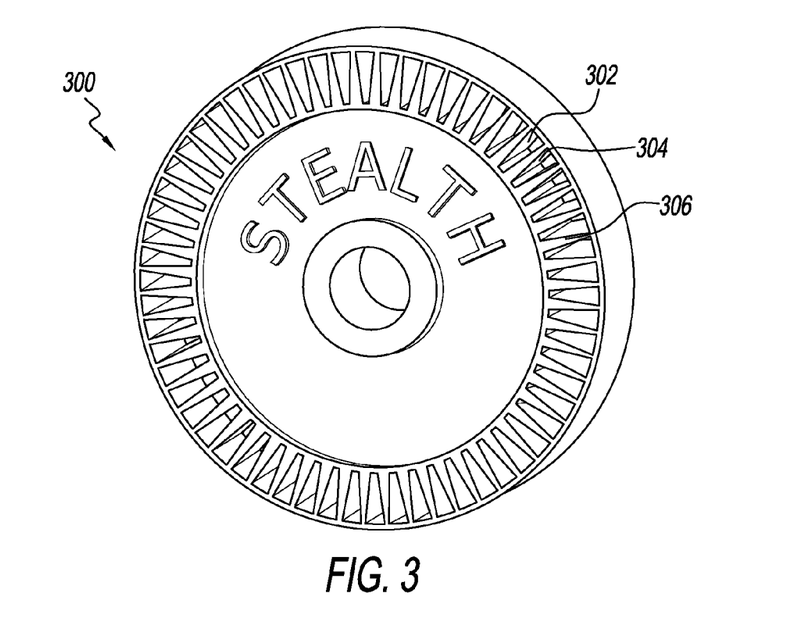
FIG. 3 is a front perspective view of an alternative embodiment of a quite bumper plate.

FIG. 3 is a front perspective view of an alternative quiet bumper plate 300. This is similar to the quiet bumper plate of FIG. 2 except the shock absorber region 302 comprises first holes 304 with an elongated inverted trapezoidal shape. The first holes are evenly spaced circumferentially. Radial walls 306 are formed between the holes. The radial walls have a relatively wide base and narrow top.

Figure 4:
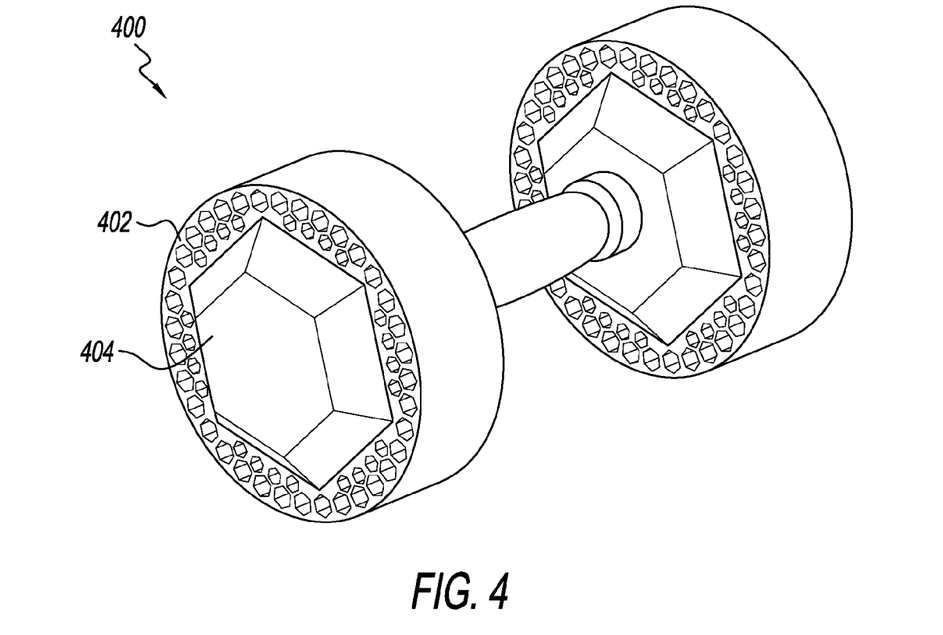
FIG. 4 is a side perspective view of an embodiment of a quiet dumbbell.

FIG. 4 is a side perspective view of a quiet dumbbell 400. The dumbbell comprises a conventional hexagonal weight dumbbell 404 with a shock absorber 402 wrapped around each weight. The dumbbell may be made of metal and the shock absorber may be made of an elastomer. The holes in the shock absorber are similar to the holes in the quiet bumper plate of FIG. 2.

Figure 5:
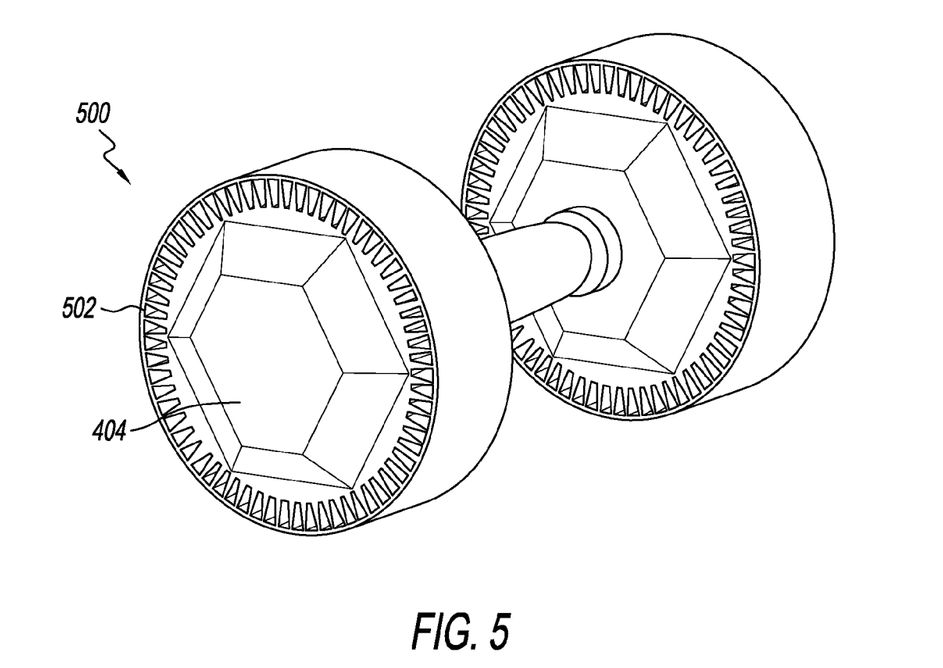
FIG. 5 is a side perspective view of an alternative embodiment of a quiet dumbbell.

FIG. 5 is a side perspective view of an alternative quiet dumbbell. The dumbbell comprises a conventional hexagonal weight dumbbell 404 with a shock absorber 502 wrapped around each weight. The dumbbell may be made of metal and the shock absorber may be made of an elastomer. The holes in the shock absorber are similar to the holes in the quiet bumper plate of FIG. 3.

The shock absorbers for either quiet dumbbell may have flat outer surfaces for stacking (not shown).

Figure 6:
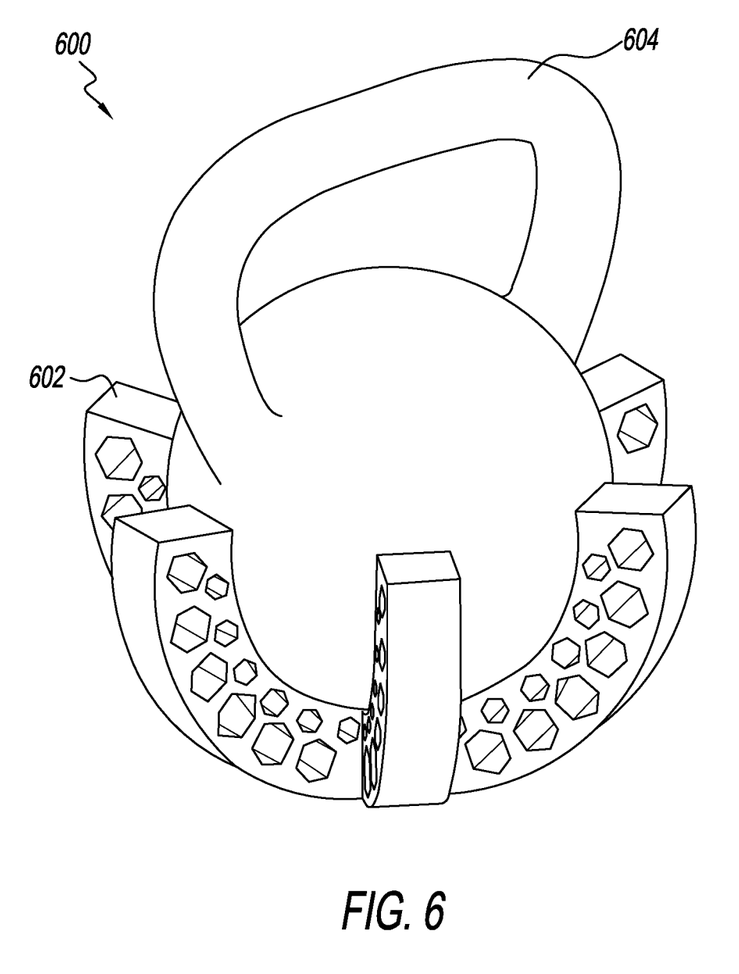
FIG. 6 is a side perspective view of an embodiment of a quiet kettlebell.

FIG. 6 is a side perspective view of a quiet kettlebell 600. The kettlebell comprises a conventional kettlebell 604 with several shock absorber crescents 602 wrapped around the weight. The kettlebell may be made of metal and the shock absorber crescents may be made of an elastomer. The holes in the shock absorber crescents are similar to the holes in the quiet bumper plate of FIG. 2. The crescents may be attached to the kettlebell by any known means, such as gluing. 8 crescents are provided radially and join at the bottom of the kettlebell. Sufficient crescents are applied so that the metal kettlebell within the crescents does not hit the ground when dropped.

Figure 7:
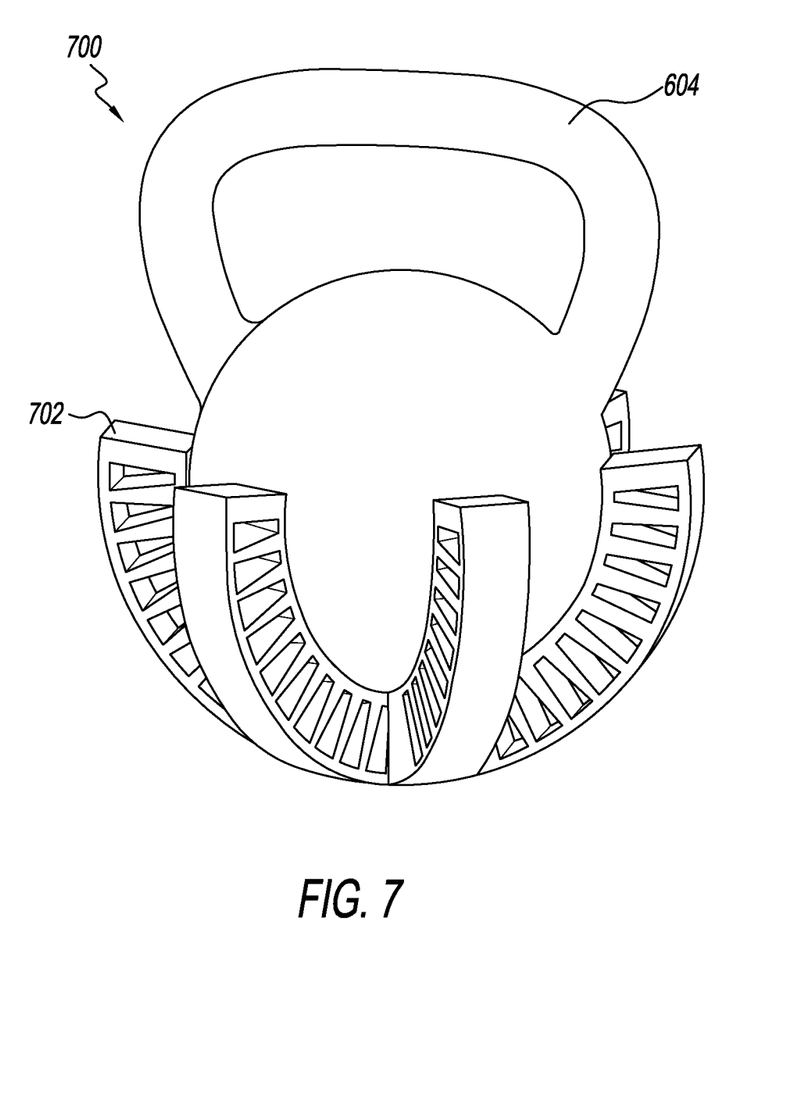
FIG. 7 is a front perspective view of an alternative embodiment of a quiet kettlebell.

FIG. 7 is a front perspective view of an alternative quiet kettlebell 700. The kettlebell comprises a conventional kettlebell 604 with several shock absorber crescents 702 wrapped around the weight. The kettlebell may be made of metal and the shock absorber crescents may be made of an elastomer. The holes in the shock absorber crescents are similar to the holes in the quiet bumper plate of FIG. 3. The crescents may be attached to the kettlebell by any known means, such as gluing. 8 crescents are provided radially and join at the bottom of the kettlebell.

Flat sheets of elastomers with shock absorber regions may be used as mats. The shock absorber regions may be similar to the ones described above. Thus when a weight is dropped on the mat, the mat will suppress noise without unduly increasing bounce. The shock absorber mats may be made by extrusion.

Example 1

Figure 8:
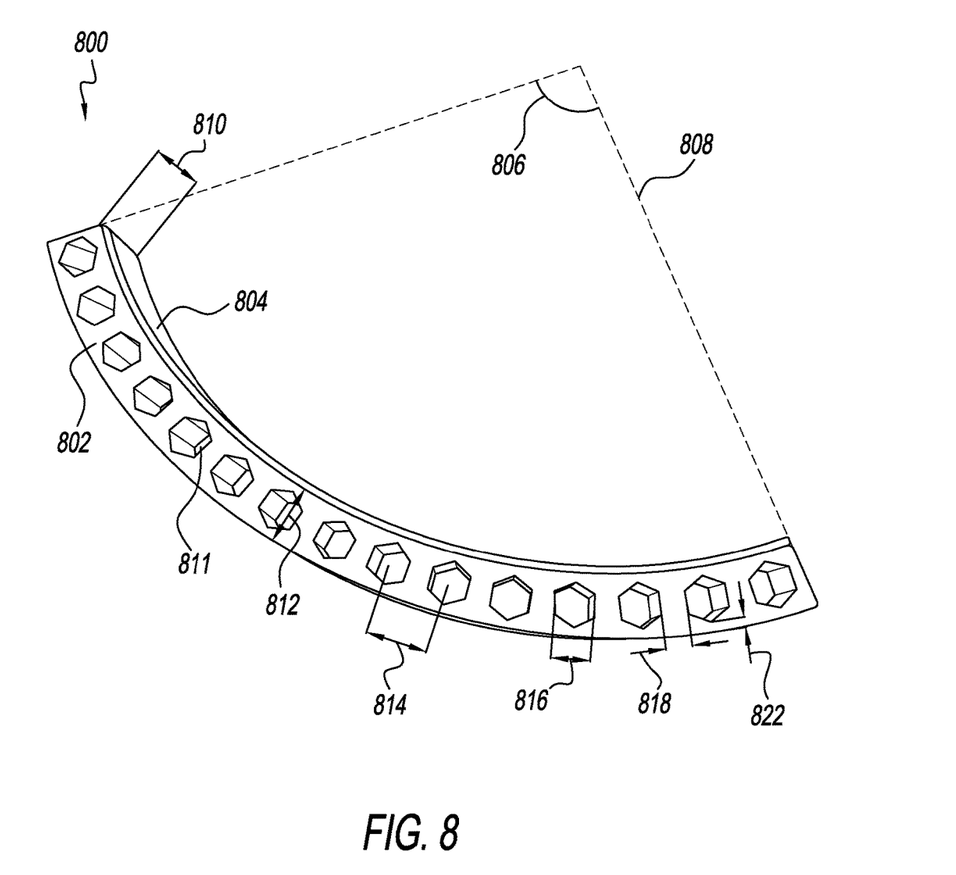
FIG. 8 is a side perspective view of a crescent shock absorber.

FIG. 8 is a side perspective view of a crescent shock absorber 800 made according to the current invention. The crescent has a thickness 810 of about 1 inch. It has a height 812 of about 1 inch. It has an arcuate shape with a crescent angle 806 of about 90°. The radius of curvature to the inside surface 808 is about 8.75 inches. Thus the crescent would conform to the outer curvature of the prior art bumper plate of FIG. 1. A single row of evenly spaced hexagonal first holes 811 is provided. The hole spacing 814 is about 1 inch. The hole width 816 is about 0.63 inches. The radial walls between the holes each have a width 818 of about 0.38 inches. The skin thickness 822 is about 0.13 inches. A first half of a reclosable 3M™ DualLock™ fastener 804 is provided on the inside surface of the crescent. The first half was mated to the corresponding second half of the DualLock fastener that was bonded to the outer radial surface of a conventional bumper plate similar to the one shown in FIG. 1. The crescent was formed by molding a thermoplastic elastomeric compound, Stantoprene™ 101-64 (item 802). The rated durometer of the Stantoprene was Shore A 69.

A first test was done with a conventional barbell weighing 135 lb. The barbell had a bumper plate on each end of the style shown in FIG. 1. The barbell was dropped from a height of 4'10 inches onto a rubber stall mat covering a poured concrete floor. The noise of the impact was measured with a decibel meter. 136 dB was recorded when the barbell was dropped without any crescent shock absorbers on the bumper plates.

A second test was run with four crescent shock absorbers attached to the outer radial surfaces of the bumper plates on the barbell using the DualLock fasteners. The crescents wrapped around the outer surface of each bumper plate. The drop test was repeated. The noise recorded was only 95 dB without an undue increase in bounce.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

We claim:

1. A quiet bumper plate comprising:
    a) an elastomeric rim, said elastomeric rim comprising a shock absorber region, said shock absorber region comprising a first circumferential row of evenly spaced first holes that pass transversely through said rim;
b) a solid elastomeric body radially inside said elastomeric rim;
c) a solid hub radially inside said solid elastomeric body; and
d) a metal collar radially inside said solid hub, said collar describing a bar hole of about 1 inch in radius such that said bar hole will fit on a bar of a barbell
wherein:
e) said quiet bumper plate has a disk shape; and
f) said quiet bumper plate has a radius in the range of 8.75 to 8.86 inches such that said bumper plate will be suitable for use in weightlifting.

2. The quiet bumper plate of claim 1 wherein:
a) said first holes have a width in the range of 0.5 to 0.75 inches; and
b) said first holes have a spacing in the range of 0.75 to 1.5 inches.

3. The quiet bumper plate of claim 1 wherein said rim has a thickness and said thickness is in the range of 1.4 to 3.75 inches.

\* \* \* \* \*